United States Patent Office 3,526,646
Patented Sept. 1, 1970

3,526,646
5,5′-DISULFAMOYLBENZOPHENONES
Stanley C. Bell, Penn Valley, Pa., assignor to American Home Products Corporation, New York, N.Y., a corporation of Delaware
No Drawing. Filed Feb. 12, 1968, Ser. No. 704,585
Int. Cl. C07c *143/80*
U.S. Cl. 260—397.7           3 Claims

ABSTRACT OF THE DISCLOSURE

2 - amino - 2′,4-dichloro-5,5′-disulfamoylbenzophenone (Ia) and the dichloroacetyl derivative thereof (Ib) are prepared by treating 2-amino-2′,4-dichlorobenzophenone with chlorosulfonic acid, then with ammonia to form Ia, then treating Ia with a dichloroacetylating agent to form Ib. Compounds of Formulae Ia and Ib are pharmacologically active as central nervous system depressants, especially as calming agents, and, in addition, are useful as intermediates.

---

This invention relates to 5,5′-disulfamoylbenzenesulfonamides. More particularly it relates to 2-amino-2′,4 - dicholoro - 5,5′-disulfamoylbenzophenone and the dichloroacetyl derivative thereof. The compounds of this invention are pharmacologically active, exerting depressant activity on the central nervous system of warm blooded lower animal hosts, eliciting a calming effect.

DESCRIPTION OF THE INVENTION

The compounds contemplated by this invention are those of Formula I:

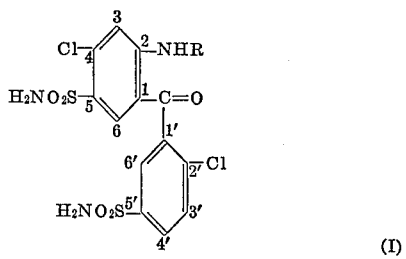

wherein R is hydrogen or dichloroacetyl.

As embodiments of this invention therefore, mention is made of 2-amino-2′,4-dichloro-5,5′-disulfamoylbenzophenone and 2,2,5′ - trichloro-2′-(2-chloro-5-sulfamoylbenzoyl)-4′-sulfamoylacetanilide, which also can be called 2-dichloroacetylamino - 2′,4 - dichloro-5,5′-disulfamoylbenzophenone.

The new compounds of this invention can be obtained by the following synthetic pathways, or obvious chemical equivalents thereof:

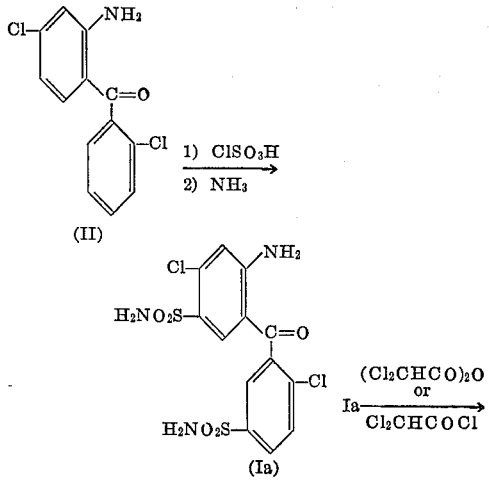

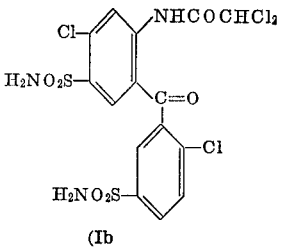

The 2 - amino - 2′,4-dichloro-5,5′-disulfamoylbenzophenone (Ia) is obtained by treating 2-amino-2′,4-dichlorobenzophenone (II) with at least 2 equimolar amounts, and preferably an excess, of chlorosulfonic acid until substitution of both aromatic rings by the sulfonyl chloride group is substantially complete; then converting the sulfonyl chloride groups to sulfonamido groups with ammonia. Formation of the disulfonyl halide takes place easily if the mixture of the benzophenone (II) and chlorosulfonic acid is heated at about 100° C. for about 1 hour; it is recovered by adding the mixture to ice, then filtering off the solid product. The sulfonamido compound is obtained by adding the sulfonyl chloride to concentrated aqueous ammonia solution, preferably in the presence of a water miscible alcohol, such as ethanol, and heating the mixture on a steam bath for at least about an hour; the product (I) is recovered, after cooling the reaction mixture, by filtration, and can be purified by recrystallization, if desired, from acetonitrile or 1,2-dichloroethane, and the like.

The mono - dichloroacetylated-di-sulfamoylbenzophenone (Ib) is prepared by treating the amino compound (Ia) with dichloroacetic anhydride or dichloroacetyl halide, preferably the chloride. It is convenient to suspend the reactants in a chlorinated hydrocarbon solvent, such as chloroform and to reflux the mixture for about one hour. The product (Ib) is recovered by cooling the reaction mixture and filtering off the precipitate. The precipitated product can be purified, if desired, by recrystallization from a solvent, such as ethanol.

Compounds of Formula I of this invention possess valuable pharmaceutical properties. In particular, as evidenced by responses elicited in standard pharmacological tests when administered to laboratory animals, such as mice, they show central nervous system depressant activity, especially a calming effect. This makes them useful to treat warm blooded lower animals, such valuable domestic animals and laboratory animals such as mice, rats and monkeys, wherever a calming effect is desired.

When used for this purpose, it may be desirable according to conventional pharmaceutical practice to combine the new compound of Formula I into compositions suitable for enteral or parenteral administration by formulation with a pharmaceutically-acceptable organic or inorganic carrier. The composition may be prepared in solid form, such as tablets, or in liquid form, such as a solution, suspension or emulsion. Suitable liquid carriers include water, gelatin, lactose, starch, talc, vegetable oils, alcohols, polyalcohols, gums, syrups, and the like. The pharmaceutical composition in addition to the active ingredient and the carrier may include auxiliary materials such as coloring, stabilizing, wetting or emulsifying agents. It is, of course, to be understood that the carrier as well as any other materials present with the active principle be inert with respect thereto.

The dosage of the compounds of Formula I will vary with the form of administration and the particular compound selected. Generally treatment is initiated with small dosages, substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In addition to being therapeutically valuable, the instant compounds are also useful in the preparation of other therapeutically valuable compounds such as, for example, those disclosed and claimed in the copending application of Stanley C. Bell and George Conklin, entitled "N-[5(5-Acylamidosulfonyl - 2 - chlorophenyl)-8-chloro-2,3-dihydro - 3-hydroxy-2-oxo-1H-1,4-benzodiazepin-7 - ylsulfonyl]acylamide, acylates and Related Compounds" assigned to the assignee of this application and filed in the United States Patent Office on the same day as this application, attorney's docket AHP–4672, Ser. No. 704,580.

The starting materials (II) for the instant process can be made by those skilled in the art by several techniques. One convenient means using readily available starting materials is outlined in the following pathway:

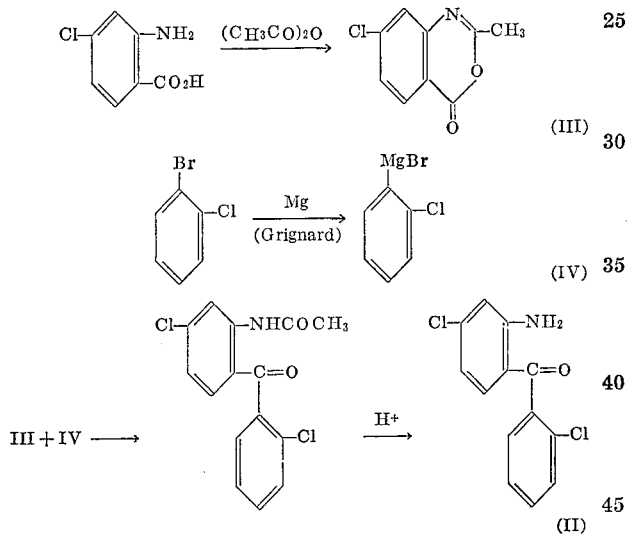

DESCRIPTION OF THE PREFERRED EMBODIMENTS

The following examples are illustrative of products which are part of the instant invention. They are not to be construed to limit the claims in any manner whatsoever.

EXAMPLE 1

2-amino-2′,4-dichloro-5,5′-disulfamoylbenzophenone

To 180 ml. of chlorosulfonic acid is added, with stirring and cooling, 92.0 g. of 2-amino-2′,4-dichlorobenzophenone.

The reaction mixture is heated on a stream bath for one hour, cooled, decomposed on ice, and the resulting yellow solid is filtered. The resulting solid sulfonyl chloride, M.P. 204–206° C. is added to a solution of 350 ml. of ethanol and 250 ml. of conc. ammonium hydroxide and heated on a steam bath for 1.5 hours. The reaction mixture is cooled and the precipitated product collected and washed with an alcohol-water mixture, M.P., 275–276° C.

*Analysis.*—Calc'd. for $C_{13}H_{11}Cl_2N_3O_5S_2$ (percent): C, 36.79; H, 2.61; N, 9.90; Cl, 16.71; S, 15.12. Found (percent): C, 37.13; H, 2.81; N, 10.01; Cl, 16.57; S, 15.22.

EXAMPLE 2

2,2,5′-trichloro-2′-(2-chloro-5-sulfamoylbenzoyl)-4′-sulfamoylacetanilide

2 - amino - 2′,4-dichloro-5,5′-disulfamoylbenzophenone, 25 g., 300 ml. of chloroform and 15 g. of dichloroacetyl chloride are refluxed for 1 hour. The reaction mixture is cooled, filtered and the product is recrystallized from ethanol, M.P., 264–266° C.

*Analysis.*—Calc'd. for $C_{15}H_{11}Cl_4N_4O_6S_2$ (percent): C, 33.60; H, 2.11; N, 7.85. Found (percent): C, 33.68; H, 1.92; N, 7.87.

In evaluating the instant compounds for pharmacological activity, they were tested in vivo by standard methods with the following results:

The compound is administered to three mice (CF–1 14 to 24 grams) at each of the following doses: 400, 127, 40 and 12.7 mg./kg.

The animals are watched for signs of general stimulation, general depression and autonomic activity and the observations are evaluated by methods described in detail in Turner, Screening Methods in Pharmacology, Academic Press, New York, p. 80 (1965), in the second entitled "A Test Group for Central Depressants."

2 - amino - 2′,4-dichloro-5,5′-disulfamoylbenzophenone, administered orally as a 1% suspension emulsified with polyethylene oxide sorbitan monooleate, caused decreased motor activity and decreased respiration at 400 mg./kg. and mydriasis at 127 mg./kg. 2,2,5′-trichloro-2′-(2-chloro-5 - sulfamoylbenzoyl) - 4′ - sulfamoylacetanilide, administered intraperitoneally in saline, caused decreased motor activity and decreased respiration at 400 mg./kg. There were no deaths with either compound at the highest dose used, 400 mg./kg.

What is claimed is:

1. A compound of the formula

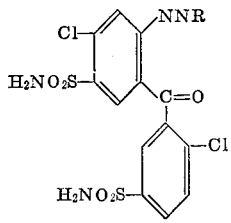

wherein R is hydrogen or dichloroacetyl.

2. A compound as defined in claim 1 which is 2-amino-2′,4-dichloro-5,5′-disulfamoylbenzophenone.

3. A compound as defined in claim 1 which is 2,2,5′-trichloro - 2′-(2-chloro-5-sulfamolybenzoyl)-4′-sulfamoylacetanilide.

References Cited

UNITED STATES PATENTS 3,055,930   9/1962   Graf _____ 260—397.7

HENRY R. JILES, Primary Examiner

S. D. WINTERS, Assistant Examiner

U.S. Cl. X.R.

260—570, 244, 562; 424—228

PO-1050
(5/69)

UNITED STATES PATENT OFFICE
CERTIFICATE OF CORRECTION

Patent No. 3,526,646      Dated September 1, 1970

Inventor(s) Stanley C. Bell

It is certified that error appears in the above-identified patent and that said Letters Patent are hereby corrected as shown below:

In column 3, lines 29 and 35, the respective identifying reference numerals "(III)" and "(IV)" presently appearing to the extreme right of the equation in the respective lines, should appear adjacent the respective closest compound formula in each of said equations.

In column 4, line 27, the word "second" should read --section--; line 45, in the formula in claim 1, the substituent group "-NNR" should read -- -NHR--; line 57, in claim 3, the term "sulfamolybenzoyl" should read --sulfamoylbenzoyl--.

SIGNED AND
SEALED
JAN 5 1971

(SEAL)
Attest:

Edward M. Fletcher, Jr.
Attesting Officer

WILLIAM E. SCHUYLER, JR.
Commissioner of Patents